US010065117B2

(12) United States Patent
Davis

(10) Patent No.: US 10,065,117 B2
(45) Date of Patent: Sep. 4, 2018

(54) PRESENTING INTERACTIVE CONTENT

(71) Applicant: George Bernard Davis, Alexandria, VA (US)

(72) Inventor: George Bernard Davis, Alexandria, VA (US)

(*) Notice: Subject to any disclaimer, the term of this patent is extended or adjusted under 35 U.S.C. 154(b) by 3 days.

(21) Appl. No.: 15/153,434

(22) Filed: May 12, 2016

(65) Prior Publication Data

US 2017/0056771 A1  Mar. 2, 2017
US 2017/0203214 A9  Jul. 20, 2017

Related U.S. Application Data

(63) Continuation-in-part of application No. 14/630,077, filed on Feb. 24, 2015, now abandoned.

(60) Provisional application No. 62/209,510, filed on Aug. 25, 2015, provisional application No. 61/966,475, filed on Feb. 24, 2014.

(51) Int. Cl.
*A63F 13/55* (2014.01)
*A63F 13/537* (2014.01)

(52) U.S. Cl.
CPC .................. *A63F 13/537* (2014.09)

(58) Field of Classification Search
CPC ...... A63F 13/537; A63F 13/55; A63F 13/822; A63F 2300/63; A63F 2300/632; A63F 2300/807
USPC .......................................................... 463/31
See application file for complete search history.

(56) References Cited

U.S. PATENT DOCUMENTS

| 5,707,288 | A | * | 1/1998 | Stephens | A63F 13/00 345/418 |
|---|---|---|---|---|---|
| 2006/0183545 | A1 | * | 8/2006 | Jourdian | A63F 7/06 463/36 |
| 2007/0007725 | A1 | * | 1/2007 | Matilla | A63F 3/04 273/236 |
| 2007/0087798 | A1 | | 4/2007 | McGucken | |
| 2008/0146334 | A1 | | 6/2008 | Kil | |
| 2010/0075761 | A1 | | 3/2010 | Lord et al. | |
| 2011/0072367 | A1 | | 3/2011 | Bauer | |
| 2011/0098110 | A1 | * | 4/2011 | Howell | G09B 5/02 463/31 |
| 2013/0165225 | A1 | | 6/2013 | Fuller et al. | |

OTHER PUBLICATIONS

International Search Report and Written Opinion for International Application No. PCT/US2016/030003, dated Aug. 8, 2016.

* cited by examiner

*Primary Examiner* — Allen Chan
(74) *Attorney, Agent, or Firm* — Fish & Richardson P.C.

(57) ABSTRACT

Story panels are generated. A story panel forms a portion of a computer game that includes multimedia content corresponding to a dramatic story and one or more game challenges. The story panels are combined into one or more episodes of the dramatic story, wherein a transition from a first story panel to a second story panel is effected conditioned on fulfilling requirements of a game challenge included in the first story panel. Input options are included in each story panel that enable a user to interact with the story panel when playing the computer game. The story panels are configured to be displayed in one of several different gaming modes. One or more story panels associated with an episode are streamed to electronic devices over network connections for presentation on displays coupled to the electronic devices.

29 Claims, 9 Drawing Sheets

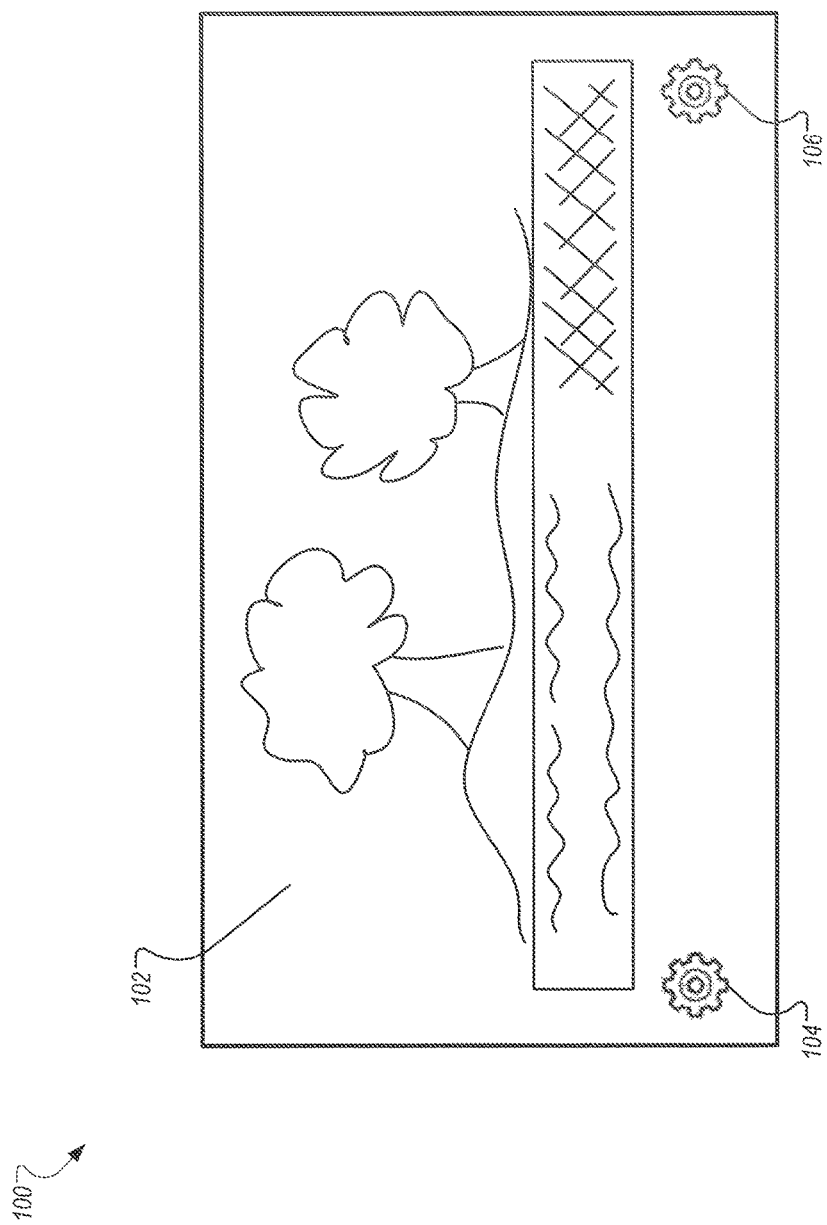

PRESENTING INTERACTIVE CONTENT

This application claims priority from U.S. Provisional Application No. 62/209,510, filed Aug. 25, 2015, and titled "Presenting Interactive Content," which is incorporated herein by reference.

TECHNICAL FIELD

This disclosure relates generally to methods and systems for presenting interactive multimedia content.

BACKGROUND

In an interactive television (TV) program or a computer game, viewers or game players may be offered elements that allow the viewers or players to interact with the TV program or game. The elements can include, for example, a link to a site giving additional data on some aspect of the TV program or game.

SUMMARY

The following disclosure describes methods and systems for authoring and presenting interactive multimedia content, such as an audio/visual streaming dramatic story that is associated with a computer game and includes one or more game challenges. Based on responses to the game challenges provided to a viewer, also referred to interchangeably as a game player (or simply player), the narrative of the dramatic story may proceed in one of several different directions.

A dramatic story may be a story that depicts a situation or series of events having vivid, emotional, conflicting, or striking interest or results. In some implementations, the dramatic story depicts a real world situation, such as ecological degradation caused or accelerated by climate change. The dramatic story can be scripted in a realistic manner to immerse the viewer or game player into the story/game as if participating in situations with real world consequences. This also may lead to changing the player's perceptions by increasing the player's knowledge of, and involvement with, the setting and underlying factual context of the unfolding story.

In some implementations, an audio/visual streaming story is partitioned into episodes, each of which is of finite duration, for example tens of minutes or a few hours. Each episode is directed towards an event or group of events associated with a real world situation. Each episode includes one or more segments, which are referred to as story panels. At the end of each story panel, story elements can be acted on (interacted with) by the player using a suitable input device, such as a keyboard, touchscreen device, mouse, voice command, and smart pen, among others. A story element that is acted on can be any visual element or setting, accompanied by a visual on-screen or auditory prompt to the viewer/game player to initiate interaction. For example, the story may depict ecological degradation caused or accelerated by climate change. In such cases, an environmental scenic element (atmosphere, ocean, waterway, wetland, forest, landscape, cityscape, desert, or icecap, among others), represented in time-lapse, may be shown to be in a state of degeneration in a story panel. Alternatively, the degeneration may be represented on-screen in some other way, for example with the depiction of a land, water, or airborne life form being affected by environmental degradation, especially degradation caused by climate change. These degrading environmental scenic elements can be dynamic. The player's interactions with gaming prompts provided on the story panels initiates gameplay in which the player can attack, retard the spread, stop, or even reverse the degradation.

In some implementations, a next story panel that is displayed is based on the player's response while interacting with the story element in the present story panel. In this manner, the flow of the story may change depending on the player's input during the gameplay, and accordingly may lead to different narrative flow paths and conclusions for the story.

While specific implementations are described herein, the invention can be implemented in many different forms, with the understanding that the present disclosure of one or more implementations is to be considered as examples of the principles, and not intended to limit the invention to the specific implementations disclosed.

In one aspect, story panels are generated. A story panel forms a portion of a computer game that includes multimedia content corresponding to a dramatic story and one or more game challenges. The story panels are combined into one or more episodes of the dramatic story, wherein a transition from a first story panel to a second story panel is effected conditioned on fulfilling requirements of a game challenge included in the first story panel. Input options are included in each story panel that enable a user to interact with the story panel when playing the computer game. The story panels are configured to be displayed in one of several different gaming modes. One or more story panels associated with an episode are streamed to electronic devices over network connections for presentation on displays coupled to the electronic devices.

Particular implementations may include one or more of the following features. A first story panel may be controlled to be presented on a display coupled to an electronic device in a first mode. Input options that enable a user to interact with the story panel when playing the computer game are disabled when a story panel is presented in the first mode.

A first story panel may be controlled to be presented on a display coupled to an electronic device in a second mode, wherein the input options that enable a user to interact with the story panel when playing the computer game are enabled when a story panel is presented in the second mode. A game challenge associated with the first story panel may be presented on the display coupled to the electronic device. A user input in response to the game challenge may be received from a user associated with the electronic device. Based on the received user input, a second story panel may be selected for presentation on the display coupled to the electronic device.

The first story panel may be included in a first episode of the dramatic story. Selecting the second story panel may comprise selecting the second story panel from the story panels included in the first episode.

A gaming score may be computed for the user based on the user input. One or more rewards options may be determined based on the gaming score. The one or more rewards options may be presented on the display coupled to the electronic device for selection by the user. A user profile associated with the user may be accessed. The gaming score may be stored as part of the user profile.

Based on the user input, a user profile associated with the user may be accessed in a social networking platform. Information corresponding to the computer game and the user input may be published in the user profile associated with the user in the social networking platform.

An episode may include story panels that, when presented in a sequential manner, narrate a portion of a scripted, realistically depicted, audio/visual streaming dramatic story. A game challenge may include game mechanics that are configured to enable the user to win points or prizes of gameplay by interacting with the multimedia content to process one or more gameplay scenarios as the multimedia content is presented in episodic form.

The input options may enable a user to control display of the story panels, wherein the control includes one or more of start, stop, move backwards, and forward between previously viewed or currently viewed story panels like pages of a multimedia book. The multimedia content corresponding to a dramatic story may include one or more of degeneration in the Earth's atmosphere, ocean, waterway, wetlands, forest, landscape, desert, icecap, or land, water, and airborne life forms.

Implementations of the above techniques include methods, systems, computer program products and computer-readable media. One such computer program product is suitably embodied in a non-transitory machine-readable medium that stores instructions executable by one or more processors. The instructions are configured to cause the one or more processors to perform the above-described actions. One such computer-readable medium stores instructions that, when executed by one or more processors, are configured to cause the one or more processors to perform the above described actions.

One such system comprises one or more processors and a story unit that includes instructions stored in machine-readable storage for execution by the one or more processors, wherein upon execution of the instructions the story unit is configured to perform one or more of the above-described actions. The system also may comprise a visual content unit that includes instructions stored in machine-readable storage for execution by the one or more processors, wherein upon execution of the instructions the visual content unit is configured to perform one or more of the above-described actions in association with the story unit. The system also may include a game mechanics controller that includes instructions stored in machine-readable storage for execution by the one or more processors, wherein upon execution of the instructions the game mechanics controller is configured to perform one or more of the above-described actions. The system also may include a rewards generator that includes instructions stored in machine-readable storage for execution by the one or more processors, wherein upon execution of the instructions the rewards generator is configured to perform one or more of the above-described actions.

The details of one or more disclosed implementations are set forth in the accompanying drawings and the description below. Other features, aspects, and advantages will become apparent from the description, the drawings and the claims.

BRIEF DESCRIPTION OF THE DRAWINGS

FIG. 1 illustrates an example story panel displaying a segment of a dramatic story series associated with a computer game.

Like reference symbols in different figures indicate like elements.

DETAILED DESCRIPTION OF THE INVENTION

Figure 2A:
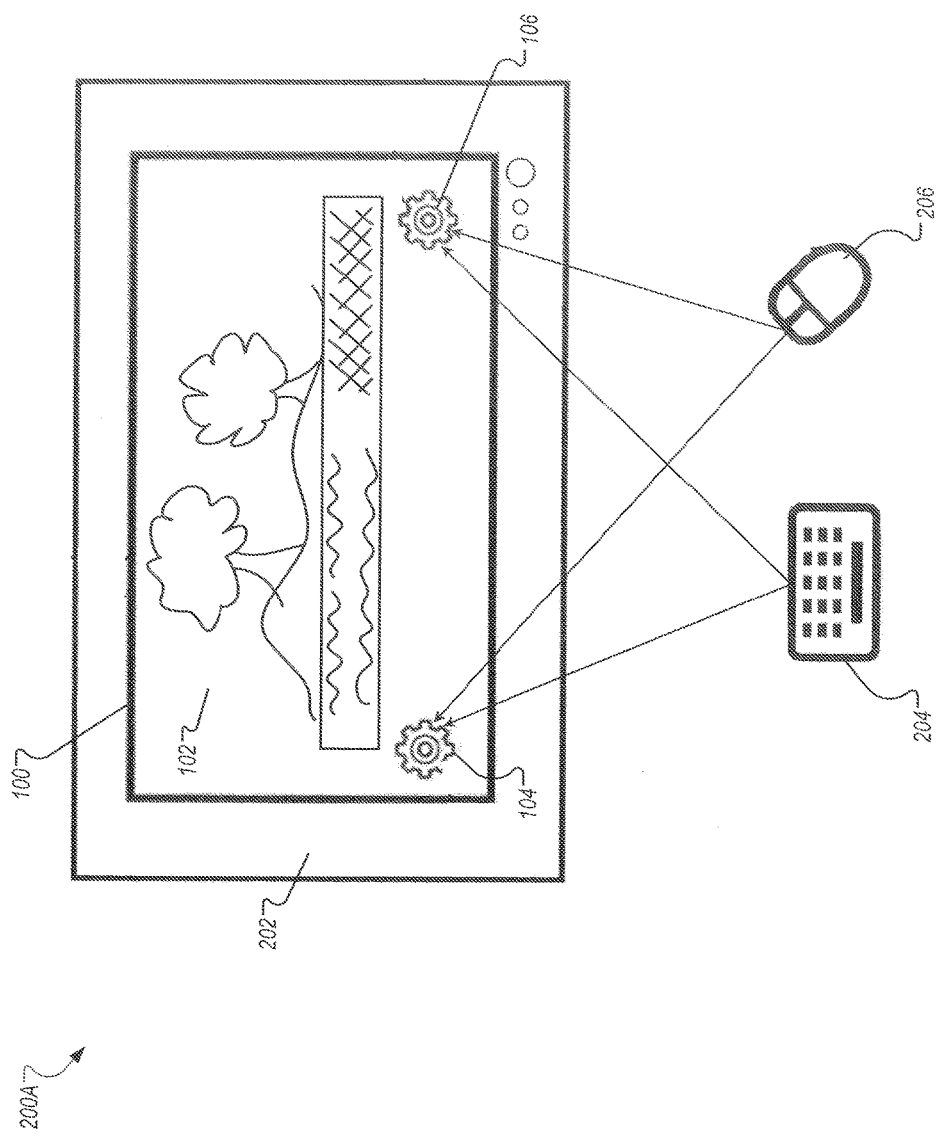
FIGS. 2A and 2B illustrate example device configurations for presenting a dramatic story series/computer game combination to a player.

In an interactive TV dramatic series, viewers may be offered functionalities that allow interactivity with the TV drama at what can be called the "display-device level." This interactivity can require no more than a standard remote control that enables channel surfing. Interactivity can also be enabled on TV services that provide a higher level of interactivity by offering video-on-demand and video recorder-like pausing, rewinding, and fast forwarding of dramatic shows, and on services that offer digital video recorder (DVR)-like commercial skipping, while others enable the viewer to link to a website that has data on some aspect of the TV program. Such interactivity can change how users control the viewing of the content, or a method of creating an interactive broadcast, for example allowing viewers to vote on an aspect of a scenario. However, such interactivity does not change the program content.

The streaming of multimedia content, similar to a TV program, which allows interactivity with the program content itself and, in doing so, influences the plot details and endings, can be achieved by developing TV-like dramatic content that combines aspects of a computer or video game. Dramatic content can also be used as an effective tool for education, problem solving, and promoting real-life changes by engaging the viewer to participate in the story by interacting with gaming challenges included in the storyline. By combining high-level interactive game elements with the storyline, the story/game can be more effective in educating the player about real world situations or series of events that are dramatized in the story/game. In contrast, typical computer or video games, including online or networked games, usually take place in non-realistic settings, in which the games do not create opportunities relevant to real world challenges.

This disclosure describes implementations that relate to interactive multimedia content that includes a story component and a gaming component. The story component corresponds to a scripted, realistically depicted, audio/visual streaming dramatic story, while the gaming component corresponds to a networked computer game. The two components are combined by embedding various game challenges in the storyline for the dramatic story. In this context, the term "scripted" indicates that the story is a fictional story that is authored by a writer and reduced to an audio/visual script containing dialogue and actions, and audio/visual effects to create audio/visual scenes. The term "realistically depicted" indicates that the dramatic story portrays real life situations as experienced by human beings, on contrast to fantasy or science fiction scenarios. The term "streaming" indicates that the story/game is distributed from one or more servers to electronic devices of players over network connections, such as the Internet, cellular networks, or other suitable connections.

The combined story/game described in this disclosure may be referred to as a serious computer game. In this context, a serious computer game indicates a computer or video game that is designed for a public education or public awareness purpose, in addition to its value as entertainment. The serious computer game may be used for mass public awareness campaigns, for example to teach viewers or players about environmental issues. The serious computer game may act as a persuasive technology system to change behaviors and attitudes toward important real world issues portrayed by the dramatic story component of the computer game. For example, a serious computer game dealing with environmental issues may be intended to change behaviors and attitudes toward ecological degradation caused or accelerated by climate change. Such a computer game that deals with environmental issues may be referred to as an eco-game.

The serious computer game described in the following sections depicts a realistic, novel-as-a-game interactive or collaborative content filled with real world game quests that are undertaken by players inside the world depicted in the dramatic story, which simulates the world where the viewer/player lives. In some implementations, the dramatic story included in the game is an interactive television series or an interactive multimedia novel, with conceptual differences, or differences in the historical path of arrival, between the story in the game described herein and a story as usually conceived in a regular episodic television series or online game.

The present disclosure also describes systems, devices and methods to create high-level interactivity in the combined story/game multimedia content, also referred to as the computer game or simply game, that is disclosed. A player can provide various inputs that control the pace of the scripted, realistically depicted, audio/visual streaming dramatic story, or to initiate gameplay with the story shown to the player, or both. The gameplay enables the player to interact with the content itself. The player can influence details of the dramatic story by responding to game challenges at periodic intervals during the presentation of the story, and thereby affect the player's perceptions of the plot, characters, and endings. In this manner, the player can get involved in the suspense and intrigue of the story.

In some implementations, the gameplay engages the player in an endless variety of game mechanics, as described below. For example, the dramatic story may depict ecological degradation caused or accelerated by climate change, and the gaming component can provide options for the player to win points, prizes, and other rewards of gameplay by responding to game challenges to fight instances of climate change depicted in the dramatic story. Additionally or alternatively, the player can win points and prizes by addressing similar issues in social media and in the world.

The computer game does more than heighten awareness, as would a documentary show or documentary series. Because the player participates physically as well as emotionally, the game can be considered as a form of persuasive technology. Because the game also may involve sharing with other players, for example in an electronic social media network, the game can be considered as a form of Mass Interpersonal Persuasion (MIP) system, which brings together the power of interpersonal persuasion with the reach of mass media. MIP systems have great potential for altering attitudes and behaviors towards real world issues, such as climate change, on a mass scale. By combining an immersive and influential story with a mass-participation game, the concepts disclosed herein can enable the public to collaborate in an effort to improve a real world situation depicted in the game, for example ecological degradation due to climate change. Among other things, the computer game can enable popular mass media to be used for various public education and awareness initiatives.

In some implementations, the dramatic story that is included in the computer game is based on a group-authored, single narrative that binds together a series of episodes. Each episode is a grouping of several story panels, where a story panel is configured to present a segment of the story. In some implementations, each story panel includes one or more scenes or visualizations of the overall storyline. In some implementations, each episode is broken into 6-12 story panels. However, other numbers are also possible.

FIG. 1 illustrates an example story panel 100 displaying a segment of a dramatic story series associated with a computer game. As shown, the story panel 100 displays a scene or visualization 102, which represents an event in the dramatic story. For example, the dramatic story deals with environmental issues, and the story panel 100 presents an environmental scene from the dramatic story.

The story panel 100 includes a navigation prompt 104 and a gameplay prompt 106. The navigation prompt 104 and/or the gameplay prompt are overlaid on the scene or visualization 102 displayed by the story panel. The navigation prompt 104 enables players to navigate through segments of the dramatic story at their own pace by moving forward to a new story panel, or returning to a previous story panel. The navigation forward or backward among story panels using the navigation prompt 104 may simulate turning the pages of a book. This can be achieved, for example, by configuring instructions associated with the computer game to enable a transition from one story panel to a next story panel, or a previous story panel, in a visual manner that simulates the turning of a page of a book.

The gameplay prompt 106 is configured to enable a player to initiate gameplay, i.e., to respond to one or more game challenges that are presented at particular points in the story panel that is displayed, which is described in greater detail in the following sections. The game challenges may be simple, for example a single question. Alternatively, the game challenges may be complex. For example, the game challenges may involve interactions with other players (such as through social media). In some implementations, game challenges include artificial intelligence-based challenges. For example, game challenges may be generated by subjecting a player's interactivity in the game or in social media to advanced analytics.

Although FIG. 1 shows the gameplay prompt 106 on the story panel 102, in some implementations there is no gameplay prompt on a story panel. This may be the case, for example, when there is no game challenge associated with the particular story panel. In such cases, the dramatic story can move forward to the next story panel automatically, or in response to a navigation prompt.

Figure 2B:
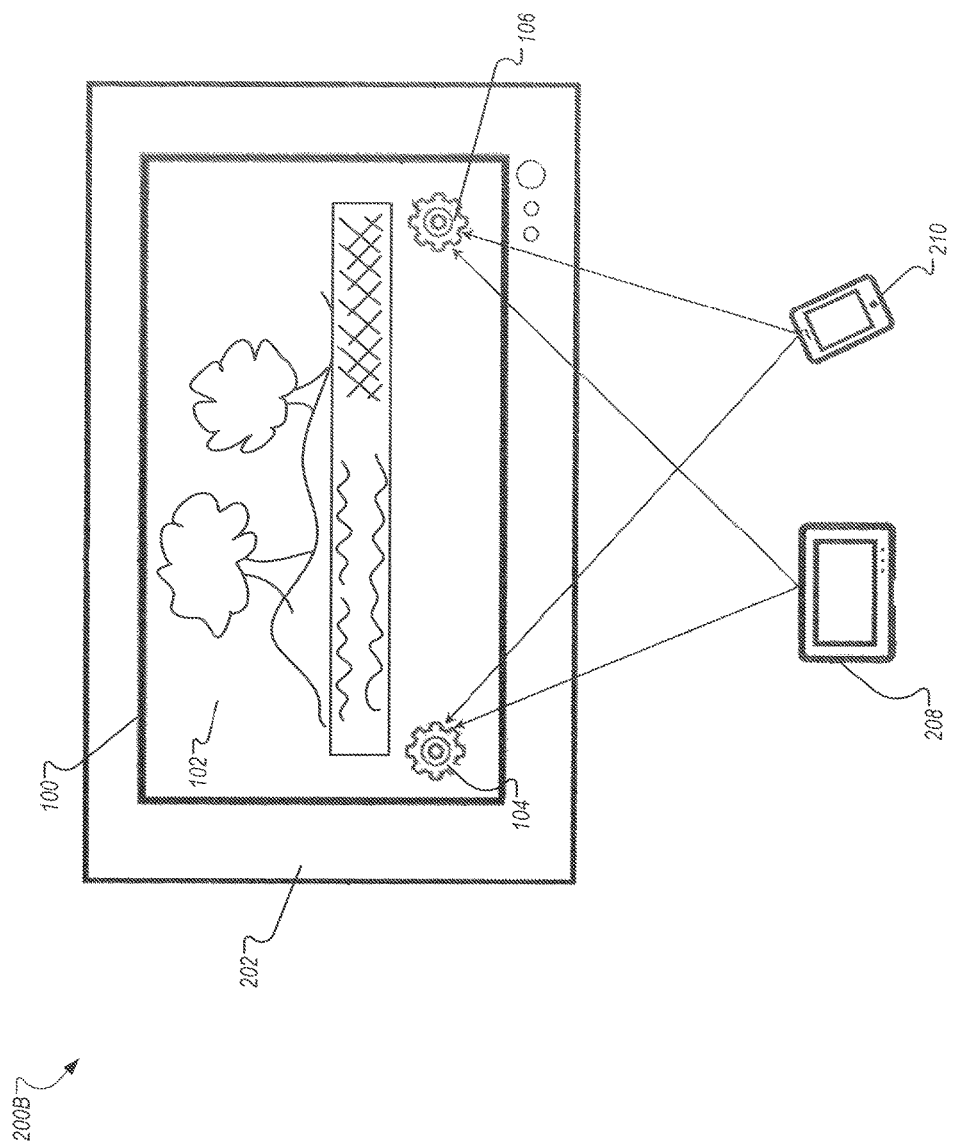

FIGS. 2A and 2B illustrate example device configurations 200A and 200B, respectively, for presenting a dramatic story series/computer game combination to a player. As shown by FIG. 2A, in the example configuration 200A, a monitor 202 is configured to display story panels from the dramatic story associated with the computer game. For example, the monitor 202 displays the story panel 100 that shows the scene 102 from the dramatic story. In some implementations, the monitor 202 is coupled to a user device, for example a computer or an electronic game controller, associated with the player. The user device is configured to process episodes of the computer game that are received from a network server, as described in greater detail below, and display the story panels on the monitor 202. In this context, a player who views the dramatic story and plays the computer game is also referred to interchangeably as a user of the story/game, and the player's associated electronic device is referred to as the user device.

The example configuration 202 also includes a keyboard 204 and a mouse 206, which are configured to act as input devices. The keyboard 204 and the mouse 206 are coupled through wired or wireless connections to the computer associated with the player. The player can navigate among story panels, or respond to game challenges that are presented, by providing user inputs through the keyboard 204 and/or the mouse 206 to control the navigation prompt 104 or the gameplay prompt 106. By interacting with the game, i.e., responding to game challenges, the player can influence the sequence of story panels that are displayed. Although the example configuration 202 illustrates the keyboard 204 and the mouse 206, other input devices also may be used.

FIG. 2B shows another example configuration 200B, in which the monitor 202 is configured to display story panels from the dramatic story associated with the computer game, such as the story panel 100 showing the scene or visualization 102 from the dramatic story. The example configuration 200B also includes a tablet computer 208 and a smartphone 210, which are configured to act as input devices. In some implementations, either the tablet computer 208 or the smartphone 210, but not both, are present. As in the configuration 200A, the monitor 202 can be coupled to a user device, for example a computer or an electronic game controller, associated with the player. In some implementations, the tablet computer 208 and/or a smartphone 210 are coupled through wireless connections to the computer associated with the player. In some other implementations, the tablet computer 208 and/or a smartphone 210 are coupled through wired connections to the computer associated with the player.

A player can navigate among story panels, and/or respond to the game challenges, by providing user inputs through the tablet computer 208 and/or the smartphone 210 to control the navigation prompt 104 or the gameplay prompt 106. By interacting with the game in this manner, the player can influence the sequence of story panels that are displayed.

In some implementations, the tablet computer 208 or the smartphone 210 includes a display, which also may present a user interface for the computer game concurrently with the game interface that is shown on the monitor 202. This may be the case, for example, when the tablet computer 208 or the smartphone 210 are distinct from the monitor 202. In such cases, the user interface shown on the display of the tablet computer 208 or the smartphone 210 may mirror the story panel 100 shown on the monitor 202, i.e., provide a representation of the scene 102, along with representations of the navigation prompt 104 and/or the gameplay prompt 106, on the display of the tablet computer 208 or the smartphone 210. In some implementations, the player can provide inputs through a touch-sensitive surface of the tablet computer or smartphone display. For example, the player can touch a portion of the display of the tablet computer 208, or the smartphone 210 as the case may be, that is proximate to the navigation prompt 104 or the gameplay prompt 106. An indication of the user input, for example a cursor changing shape, size or color, may be shown simultaneously on the display of the tablet computer 208 or the smartphone 210, and the monitor 202. This may be the case, for example, when the inputs provided by the player using the tablet computer 208 or the smartphone 210 are communicated through wireless or wired connections to the computer coupled to the monitor 202.

In some implementations, the monitor 202 represents the display of the tablet computer 208 or the smartphone 210. This may be the case, for example, when the player's user device is the tablet computer 208 or the smartphone 210 itself. In such cases, the monitor 202 and the tablet computer 208, or the monitor 202 and the smartphone 210 as applicable, can be a single physical unit. The player can view the story panels of the dramatic story on the tablet computer display or the smartphone display. In some implementations, the player can interact with the game challenges by providing inputs through the touch-sensitive surface of the display of the tablet computer 208 or the smartphone 210. In some other implementations, the player can interact with the game challenges by providing inputs through other input devices that are coupled to the tablet computer 208 or the smartphone 210, such as a keyboard or a mouse, as described previously.

Figure 3A:
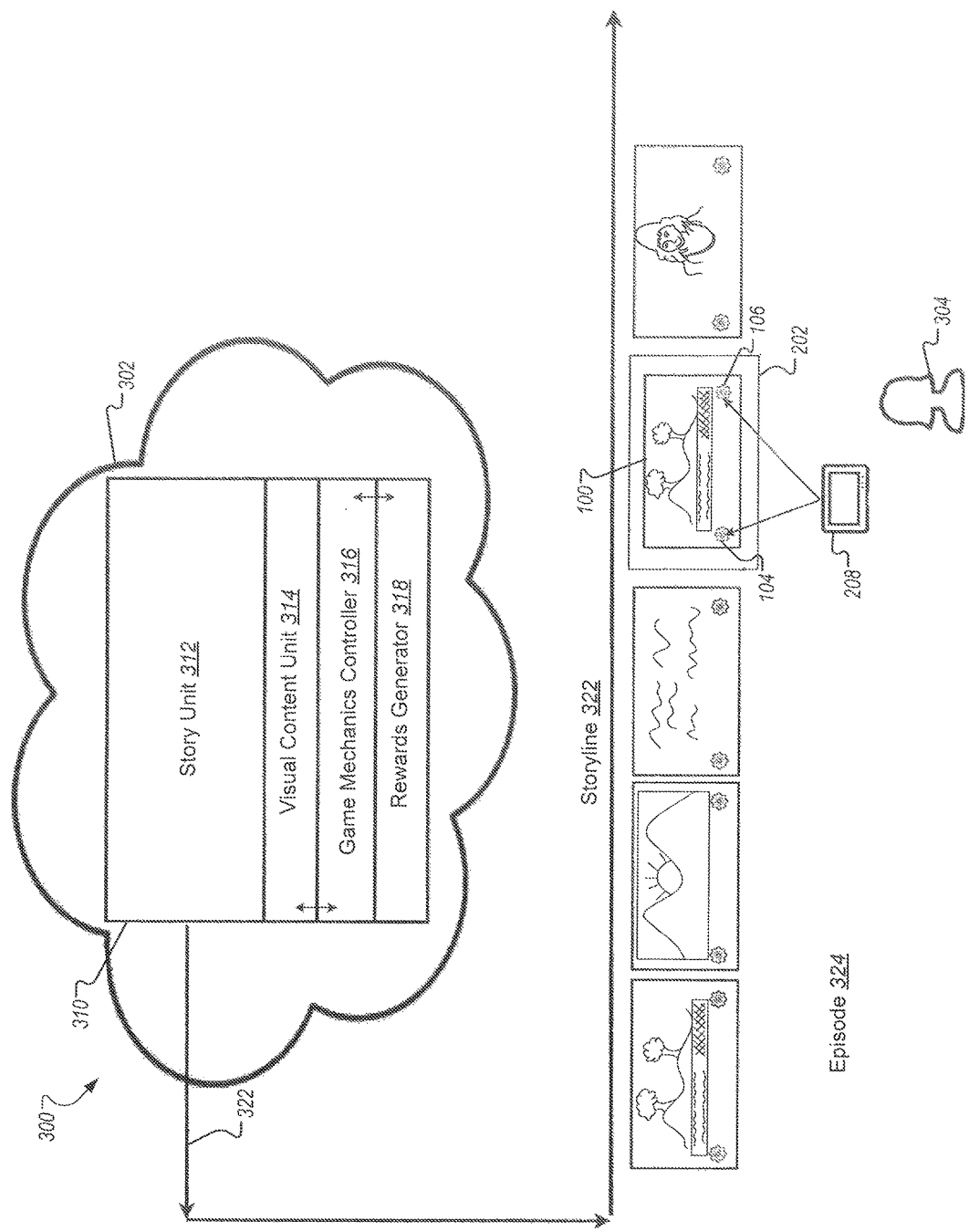
FIGS. 3A and 3B illustrate an example system for streaming, from a network server to user devices, interactive multimedia content that combines a dramatic story series with a computer game.
Figure 3B:
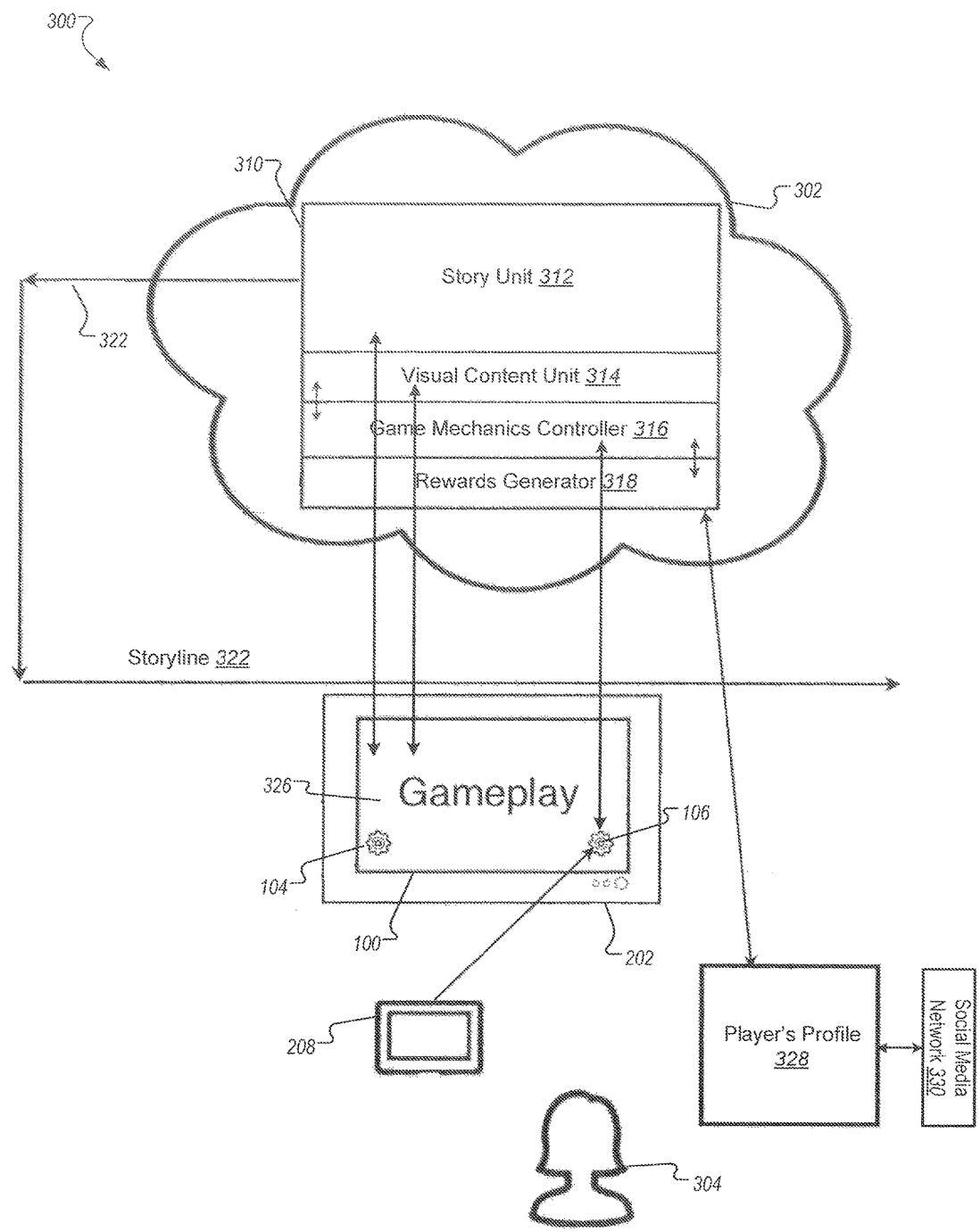

FIGS. 3A and 3B illustrate an example system 300 for streaming, from a network server to user devices, interactive multimedia content that combines a dramatic story series with a computer game. The communications system 300 includes a network server 310 that is located in a network cloud 302. The network server 310 includes a story unit 312, a visual content unit 314, a game mechanics controller 316 and a rewards generator 318. The network cloud 302 represents locations that are remote to the user devices and accessible via one or more network connections.

The network server 310 hosts the interactive multimedia content. The story unit 312 stores the dramatic story along with the game challenges that are part of the computer game. The story unit 312 may store one or more storylines associated with the dramatic story. In some implementations, the story unit 312 is configured to accept new story panels and gameplay scenarios over time.

The network server 310 streams a storyline 322 from the story unit 312 to a user device, for example to a computer coupled to the monitor 202 that is associated with a player 304. The storyline 322 includes a number of story panels, for example story panel 100, which are grouped into episodes, such as episode 324. The player 304 views a story panel on the monitor 202 and provides user inputs for controlling the display sequence of the story panels, or interacting with the computer game, using a suitable input device. For example, the player 304 uses the tablet computer 208 to interact with the navigation prompt 104 or the gameplay prompt 106.

Each episode, such as episode 324, can be of a finite duration, for example 25-60 minutes. Different episodes can be of different durations, or different episodes can be of uniform duration.

As noted previously, each episode can include a number of segments, which are referred to as story panels. For example, FIG. 3A illustrates that the episode 324 includes five story panels. However, in some implementations, each episode can include a different number of story panels, for example 6-12. In some implementations, different episodes may include a same number of story panels. However, in other implementations different episodes may include different numbers of story panels. For example, one episode may include five story panels, a second episode may include six story panels, while a third episode may include nine story panels, among others.

In some implementations, the game gives the player 304 control over the story panels similar to control over pages in a book. By using the navigation prompt 104, the player 304 can move through the episode 324 from one story panel to another story panel at one's own pace, pause to ponder, observe the scene or visualization shown in the story panel, for example scene 102, or return to a previous story panel, as is possible with pages of a book.

In some implementations, the first story panel of each episode includes an opening scene. The opening scene introduces the characters, the situation, or the villain, among others, in a manner similar to a television drama. For example, the dramatic story component of the computer game may depict environmental degradation caused by human activities. Episode 324 of the game may be titled "The Bay is Dying" or "The Planet is Dying," or some other suitable name, with the first story panel in episode 324 displaying a scene dealing with toxic runoff into the Chesapeake Bay Watershed.

In some implementations, a number of gaming modes are associated with a story panel in each episode. For example, four different gaming modes may be associated with a story panel.

In some implementations, a first gaming mode is referred to as the "story mode." When a story panel is displayed in the story mode, the gameplay prompts in the story panel, which allow the player to respond to the game challenges, are temporarily disabled while a television dramatic story is presented in the story panel. Continuing with the above example of a dramatic story that depicts environmental degradation, during the presentation of the environmental scene in the story panel, the story panel portrays an environmental feature in narrative form without introducing any game challenges. The environmental feature may include the Earth's atmosphere, ocean, waterway, wetlands, forest, landscape, desert, icecap, or land, water, or airborne life forms, among others.

In some implementations, a second gaming mode is referred to as the "read mode." When a story panel is displayed in the read mode, the gameplay prompts in the story panel are enabled. Continuing with the above example of the dramatic story dealing with environmental issues, the story panel may segue, from the environmental feature that is displayed, to an environmental and climate-change data set visualization. In some implementations, this visualization may be a time lapsed footage showing environmental degradation over time.

In some implementations, the visualization includes user interaction points, also referred to as hotspots, which allow the player to interact with the visualization. The user interaction points or hotspots may be created by Flash animation. When the player provides an input selecting a hotspot that points to a particular feature in the scene, additional information related to the particular feature is displayed in the story panel.

In some implementations, the story panels, for example story panel 100, is presented in a web browser application on the monitor 202, such as Internet Explorer™, Edge™, Google Chrome™, Firefox™, Apple Safari™, or Opera™. In such cases, selection of the user interaction points or hotspots may show three-dimensional (3D) animation that are created using suitable technologies, for example WebGL, HTML5, Java 3D™, among others.

In some implementations, the visualization segues to a game in which the player is challenged to take actions to counter the enemy or other adversarial forces in the game. In the present example, this may be a specific climate change effect on the environment that is presently depicted in the story panel. In some implementations, the story panel transitions to a third gaming mode, referred to as the "game mode," and presents the gameplay screen 326, as shown by FIG. 3B.

When a story panel is displayed in the game mode, the story panel presents one or more interactive challenges to the player, and the computer game waits for input from the player in response to the challenges. For example, the story panel 100 may present the gameplay prompt 106 to allow the player to use a suitable input device to interact with the gameplay prompt 106 to initiate gameplay. In some implementations, the gameplay prompt 106 may not be displayed when the story panel is in the story mode or the read mode. However, the gameplay prompt 106 may be displayed when the story panel transitions to the game mode.

By playing the one or more game challenges that appear, the player can win points, prizes, and other rewards of gameplay. The challenges that are presented to the player may include one or more of the game mechanics listed in Table 1. Other game mechanics that are not listed in Table 1 also may be used.

TABLE 1

| | | |
|---|---|---|
| Achievements | Countdown | Ownership |
| Appointments | Discovery | Progression |
| Behavioral Momentum | Epic Meaning | Quests |
| Blissful Productivity | Free Lunch | Reward Schedules |
| Bonuses | Levels | Status |
| Cascading Information | Loss Aversion | Urgent Optimism |
| Community Collaboration | Lottery | Virality |

Among the game mechanics shown in Table 1, "Achievements" indicate a virtual or physical representation of having accomplished something. Achievements can be easy, difficult, surprising, funny, accomplished alone or as a group. Achievements are a way to give players a way to advertise what they have done indirectly as well as add challenge and character to a game. Achievements are often considered "locked" until the player has met the series of tasks that are required to "unlock" the Achievement. Badges can be earned from completing tasks/missions in gamification platforms.

"Appointments" indicate game dynamics in which at a predetermined times/place a player must log in or participate in game, for positive effect. "Behavioral Momentum" indicates the tendency of players to keep exhibiting the same behavior or performance characteristics that they have been previously doing. "Blissful Productivity" represents the concept that playing in a game makes a player happier working hard in comparison to what the player would experience while relaxing. This represents the human tendency to gain satisfaction by doing meaningful and rewarding work.

"Bonuses" indicate a reward to a player after having completed a series of challenges or core functions during gameplay. Bonuses can be achieved from completing a combination of challenges, or for a specific special task.

"Cascading Information Theory" indicates the theory that information should be released in the minimum possible snippets to gain the appropriate level of understanding at each point during a game narrative. For example, by showing basic actions first to the player, and unlocking more as the player progresses through levels. This may be achieved in a staged process to avoid information overload to the player.

"Community Collaboration" represents a game dynamic in which an entire community of players is rallied to work together to solve a riddle, a problem or a challenge. "Countdown" represents a game dynamic in which players are given a limited amount of time to perform a task. "Discovery," which also may be referred to as "Exploration," is a game feature that encourages players to discover new pages within a gaming website. This may drive up page views and time-on-site. For example, players may be given a multiplier bonus based on how many new pages they read each week. "Epic Meaning" indicates a game feature that represents the situation that players may be highly motivated if they believe they are working to achieve something great, awe-inspiring, or bigger in a societal context compared to their immediate interests.

"Free Lunch" indicates a game dynamic in which a player feels that he or she is getting something for free due to someone else having done work. The work is perceived to have been done to avoid breaching trust in the scenario, but not by the player in question.

"Levels" represent a system by which players are rewarded an increasing value for accumulation of points. Additional game features or abilities may be unlocked as players progress to higher levels. Levels also may be used as a motivational tool to keep players progressing forward. "Loss Aversion" indicates a tool to influence a player's behavior not through rewards, but by avoiding punishment, or varying punishments through status, access, power, loss of resources or being downgraded. "Lottery" represents a game dynamic in which the winner is determined solely by chance. This may create a high level of anticipation.

"Ownership" represents a game dynamic that creates a sense of loyalty in the players towards the game. "Progression" represents a game dynamic in which success is granularly displayed and measured through the process of completing itemized tasks. For example, progression may take place by "leveling up" after a certain set of criteria are met, such as defeating enough enemies to raise a quantity, which is termed experience points. Leveling up may provide benefits such as increasing attributes or awarding skill points.

"Quests," which are also referred to as "Challenges" in some cases, represent a competition or a series of obstacles that a player must overcome during gameplay. Quests may be used to organize player effort. "Reward Schedules" represent timeframe and delivery mechanisms through which rewards (for example, points, prizes, or level ups, among others) are delivered. "Status" is a game mechanic that represents the rank or level of a player in the game. Players may be motivated to try to reach a higher level or status in the game. Rewards such as badges or points may be used to elevate Status by showcasing the talents, expertise, and accomplishments of the players.

"Urgent Optimism" represents an extreme self-motivation of the player, and indicates the player's desire to act immediately to tackle an obstacle, combined with the belief that the player has a reasonable hope of success. "Virality" represents a game element that requires multiple participants to play, or that can be played better with multiple participants.

Based on the input provided by the player to address the game challenge that is presented to the player, the computer game progresses to a new story panel, or a new episode of the dramatic story. For example, considering the environmental degradation example described above, a specific climate change related game challenge may be presented to the player. By addressing this challenge, the player may get involved with participatory learning about climate change. In some small eco-games that depict environmental issues, gameplay in the gaming mode can take a short duration of time, for example between 1 and 5 minutes. For example, in the episode titled "The Bay is Dying," the scene shown in the story panel may be a depiction of toxic runoff into the Chesapeake Bay watershed, which transitions to a visualization of the effects of toxic runoff into the Chesapeake Bay over time. Then an interactive challenge on water toxicity may be presented.

FIG. 3B shows the player 304 using the tablet computer 208 to interact with the gameplay prompt 106 that is shown on the gameplay screen 326 of a story panel. In some implementations, the user device sends a signal to the game mechanics controller 316 when the player 304 interacts with the gameplay prompt 106. Upon receiving the signal from the user device, the game mechanics controller 316 interacts with the story unit 312 and/or the visual content unit 314 to send new scenes or visualizations corresponding to the story panel to the monitor 202. The scenes or visualizations are shown on the gameplay screen 326 as representations of the challenge faced by the player 304 during gameplay.

For example, considering a game that depicts environmental degradation, the scenes or visualizations may include time-lapse cutaways of: agricultural runoff; waste from cities or towns; toxic air; declining marine population; declining air quality; or degrading water quality and its effects. These scenes or elements may represent the adversarial challenge faced by the player in relation to the segment of the story depicted in the present story panel. For example, considering "The Bay is Dying" or "The Planet is Dying" example episode, the challenge may be toxic runoff into the Chesapeake Bay Watershed, or some suitable other climate change effect. The game mechanics controller 316 may send to the monitor 202 visualizations of toxic runoff and other environmental degeneration caused by pollution and climate change in the Chesapeake Bay Watershed. Additionally or alternatively, the game mechanics controller 316 sends one or more gameplay challenges to the monitor 202. The player 304 attempts to meet the challenges commensurate with one's abilities. In some implementations, rather than playing the game challenges in an abstract manner, the story gets the player involved with characters in the episode, for example an elderly fisherman and his family. In this manner, the game challenge, for example making decisions to save the planet, may be humanized through character identification.

In some implementations, the game mechanics controller 316 sends additional game challenges, or other game activities, to the monitor 202 when the player 304 responds to a game challenge. The game mechanics controller 316 may interact with the rewards generator 318, which computes a score as a measure of how well the player 304 addressed the game challenge. The score may be displayed on the monitor 202. Additionally or alternatively, the score is recorded as part of the player's profile 328. Other information also may be recorded in the player's profile, such as identifying information about the player, status of the game played by the player, scores from past gameplays, among others.

In some implementations, the player's profile 328 is stored in the cloud 302, for example in a database coupled to the network server 310. Additionally or alternatively, the player's profile 328 may be stored in the player's user device. In such cases, the network server 310 may communicate the player's score to the player's user device over network connections. A story panel prompt to access the player's profile may be enabled when the story panel is presented in the read mode, game mode or an administrative mode that is described below.

In some implementations, the player's profile is linked to a social media profile in an electronic social media network 330. For example, the player may maintain a user profile in Twitter™, Facebook™ or other electronic social networking services. In such cases, the network server 310 may access the corresponding social media profile, for example by using one or more application programming interfaces (APIs) provided by the electronic social media network 330, and post the player's score in the associated social media profile. This may be the case, for example, when the player 304 grants permission to the network server 310 to access the player's social media profile and post the player's score in the social media profile.

In some implementations, the API connectivity to a player's social media profile enables the player to form Internet relationships with other players based on game challenges. For example, multiple gaming sessions may be established through the network server 310, connecting multiple players at their devices. Competitive ranking may enable players to see how they stack up against other players, both those known to them and other players in their area and around the world. Game scores can be presented in various demographic contexts, and thereby give players more information on the gameplay being made by different demographic groups.

In some implementations, players are connected through peer-to-peer connections, instead of going through the network server 310. In such cases, a player's user device may establish a direct connection with another player's user device. The instances of the computer game that are executed on the respective user devices may be synchronized with one another. In some cases, one or more of these game instances communicates information about the players' gameplay to the network server 310.

In some implementations, additional scoring is integrated into the game if the player addresses other challenges in the real world and records this activity, for example by reporting through social media. APIs provided by the electronic social media network 330 may integrate the player's self-reported scores for completion of such real world activities with the player's scores that are obtained via gameplay as described above.

In some implementations, when a user device connects to the network server 310, or to other user devices during gameplay, users are authenticated to one another, or to the network server 310, using suitable authentication protocols. For example, standard authentication protocols like RSA public key cryptography, Elliptic Curve Cryptography, Secure Socket Layer (SSL), Kerberos, among others, may be used.

In some implementations, the goal of the computer game is to create deep emotional involvement that supplements the desire to win rewards. In such implementations, the computer game combines the power of stories with the addictive nature of games. Players may carry the story/game in their minds even when they are not playing. Together, the story and the game may involve the kind of persuasive technology that changes behavior and attitudes even when the player is not engaged in on-screen gameplay.

In some implementations, the game is portable. In such cases, a player can transport the game on a portable device, for example by caching one or more episodes of the game into storage memory coupled to the devices. The player can watch and play the game at a different time or place as convenient.

In some implementations, each computer game is presented in one of several different levels. The visualizations in the story panels, or the game challenges that are presented to the player, vary depending on the level of the game. The levels may be based on degree of difficulty. For example, in an environmental-themed game, the levels may depend on the level of climate or environmental science implicated in the challenge. In some implementations, the player may select a level before an episode is streamed, or during gameplay itself. By playing, the player gets a score that is calibrated for each player corresponding to the level at which the game is played. The highest level of each game can involve finding a balance between the needs of various stakeholders in the game, who represent real world interests. For example, in an eco-game depicting the Chesapeake Bay watershed issues, the highest level of gameplay may involve agricultural needs, industrial needs, urbanization and toxic runoff.

In some implementations, the next story panel of the episode is displayed only after the player addresses the one or more challenges that come up during gameplay in the present story panel. The player can move to the next story panel to continue watching the dramatic story without addressing the challenges presented in the story panels. However, in such cases, gameplay prompts may be presented to urge the player to return and address any bypassed challenge.

In some implementations, decision makers and policy makers are involved in the computer game and create predictive intelligence about a topic or theme associated with the dramatic story that is enriched by gameplay. For example, the network server 310 may record the responses by various players to game challenges—the responses may be transmitted to the network server 310 by the respective user devices. The network server 310 may store the user responses, and the results of the players' gameplays, in a database coupled to the server. Various decision makers or policy makers can perform data mining on the player responses and the corresponding game results to design policies for the particular real world issue depicted by the game. In this manner, players' inputs can be considered as representative of public feedback for the relevant issues.

In some implementations, the game calculates various social effects and consequences, for example economic and/or environmental consequences, faced by the topic or theme depicted in the game, according to models that are similar to models used by experts in the related fields. At this level, gameplay may involve translation of scientific and economic models into models that dramatize their effects and consequences for presentation in the story. These effects may minimize or amplify the player's ability to make an impact on the topic depicted in the story.

In some implementations, a fourth gaming mode is referred to as an "administrative mode." When a story panel is displayed in the administrative mode, a player can check aggregate game scores, view possible prizes, or access an associated social media profile. The computer game can allow the player to access a social media profile, for example in the electronic social media network 330, via an API, which may provide options to take additional actions in social media and in the surrounding world for additional points and prizes.

In some implementations, in the administrative mode, the player has the option to repeat the story panel, or the entire episode. In some implementations, there is a "campaign mode," in which the player can experience the dramatic presentation of various storylines as game simulations are displayed to the player, without the player engaging in actual interactions with the story/game by responding to gameplay prompts.

In some implementations, the game includes a "political mode." In such cases, a player plays the game with other players. The collaboration with other players can be enabled through a cloud-based integration hub that is accessed through the player's profile, as described previously. The player negotiates with other players to influence them to take certain steps to achieve the player's desired gameplay objectives. A randomization of power and control can be given to different players to avoid predictability in the results and thereby keep the game fresh and interesting.

In some implementations, the network server 310 streams one or more story panels associated with an episode, such as episode 324, to the user device, for example the computer associated with the player 304. The user device may display a story panel included in the episode, while caching the other story panels in computer memory (for example, flash memory or hard drive) coupled to the user device. Based on the player's input for the navigation prompt or gameplay prompt associated with a presently displayed story panel, the user device can determine the next story panel, from among the cached story panels, to display on the monitor.

The user device can use instructions that are sent by the network server along with the episode 324 to determine which story panel to display next, depending on the user input received. In some implementations, the instructions are embedded in the story panels. For example, instructions corresponding to the navigation prompt 104 associated with the story panel 100 can include various permissible options for the user input. For each permissible user input, the instructions may map to one of several different story panels in the episode 324. When a user input is received, the input is checked with the permissible options for the user input. If there is a match, then the mapped story panel associated with the matching option is retrieved from the cache and displayed on the monitor 202.

In a similar manner, the instructions corresponding to the gameplay prompt 106 associated with the story panel 100 can include various permissible actions that the player may take during gameplay, which are determined based on the user input provided during a game challenge. For each permissible action, the instructions may map to one of several different story panels in the episode 324. When a user input is received, the input is checked with the permissible gameplay actions for the user input. If there is a match, then a story panel that is associated with the matching gameplay action is retrieved from the cache and displayed on the monitor 202.

In some implementations, a permissible navigation option, or a gameplay option, maps to a new episode of the computer game. This may be the case, for example, when the story panel that is presently displayed is the terminal story panel of the episode that is presently streamed. In such cases, based on the user input, the user device sends a request to the network server 310 for the new episode of the game. The network server 310 can respond by sending the requested episode to the user device.

In some implementations, the instructions associated with the computer game are used to predict the player's input corresponding to the navigation prompt, and/or the gameplay prompt. In some cases, the user device can predict, by processing the instructions sent by the network server 310, what the next story panel, or the next episode, is going to be, based on the player's past actions. The user device can accordingly retrieve the predicted next story panel and prepare it for presentation, for example retrieve from the hard drive where the story panels are locally stored and place the retrieved story panel in an easily accessible staging memory associated of the device, for quick transition to the new story panel when the user input is received. Additionally or alternatively, a request can be automatically sent from the user device to the network server 310 for the next predicted episode. The network server 310 can stream the next predicted episode, which is then cached in the user device memory.

In some cases, the prediction is performed by the network server 310, for example by the game mechanics controller 316. This may be the case, for example, when the user device communicates the inputs received from the player to the game mechanics controller 316. The latter can parse the player's inputs and predict the next action that the player can take. Accordingly, the game mechanics controller 316 can determine one or more story panels that are likely to be displayed based on future actions by the player. The game mechanics controller 316 can interact with the story unit 312 and/or the visual content unit 314 to send the likely story panels to the user device for pre-caching in the device memory.

As noted previously, in some implementations a game challenge involves interaction by a player with other players. This may be the case, for example, when the game involves peer-to-peer gaming or collaborative gaming. In some cases, the interaction between players can be enabled through social media. For example, the game may establish connections with a player's social media profile through an API provided by a social networking platform, and allow the player to play the game by interacting with others who are connected to the player's social media profile in the social networking platform.

When a game challenge involves such interaction by a player with other players, a next story panel that is displayed to a player may be determined based on the player's response to a game challenge and also based on responses provided by other players to their respective game challenges shown in their respective story panels. For example, the game mechanics controller 316 may receive inputs from user devices associated with various players who are interacting with each other to play the story/game. For each player, the game mechanics controller 316 can determine the next story panel to display based on the particular player's input and inputs provided by other interacting players. In this manner, greater dynamism may be achieved in the story/game. The narrative flow of the dramatic story shown to a player may depend not only on the individual actions of the player, but also on the collaborative effort of other players.

As noted previously, in some implementations, the central topics of the episodes that are streamed by the network server 310, for example episode 324, revolve around important social and ethical concerns, such as environmental degradation. For example, the episode may be "The Bay is Dying," which may depict toxic runoff into the Chesapeake Bay Watershed. Other example episodes may be based on issues related to matters such as sea level rise; oceanic changes; changes in breathable air quality; water scarcity; food scarcity; severe changes in weather patterns leading to droughts, severity of storms or melting icecaps; climate-caused migrations of people or animals; endangered or invasive species; deforestation; human conflicts caused by environmental changes, such as mass population shifts or fights for food; health effects of environmental changes, such as asthma attacks, allergic reactions, heat-related deaths and injuries; or infectious diseases, including mosquito-borne or air-borne diseases.

Accordingly, the implementations disclosed herein include, among others, systems and methods to stream, over the Internet, World Wide Web or other suitable communication media, highly interactive multimedia content, which seamlessly combines television dramatic stories with a computer game, and/or online electronic social media networks. The dramatic stories that are depicted may be of redeeming social value. Such stories, for example with themes like that of the "The Bay is Dying" episode, deal with major threats to human survival, such as ecological destruction. Traditional TV series do not employ similar high levels of interactivity. For example, the technologies disclosed herein segue smoothly from the storyline of a dramatic TV series to a computer game, and back. In some implementations, there is one seamless flow of the dramatic story and the computer game, as described above, instead of having separate interfaces for the dramatic story, the game, and user navigation. The unified interface is abstracted by a set of API calls that determine what is happening in each story panel and present the associated visualizations and game challenges to the player. In some implementations, the story/game is independent of the input devices. In such cases, a variety of input devices can include drivers to interact with the story/game.

Figure 4:
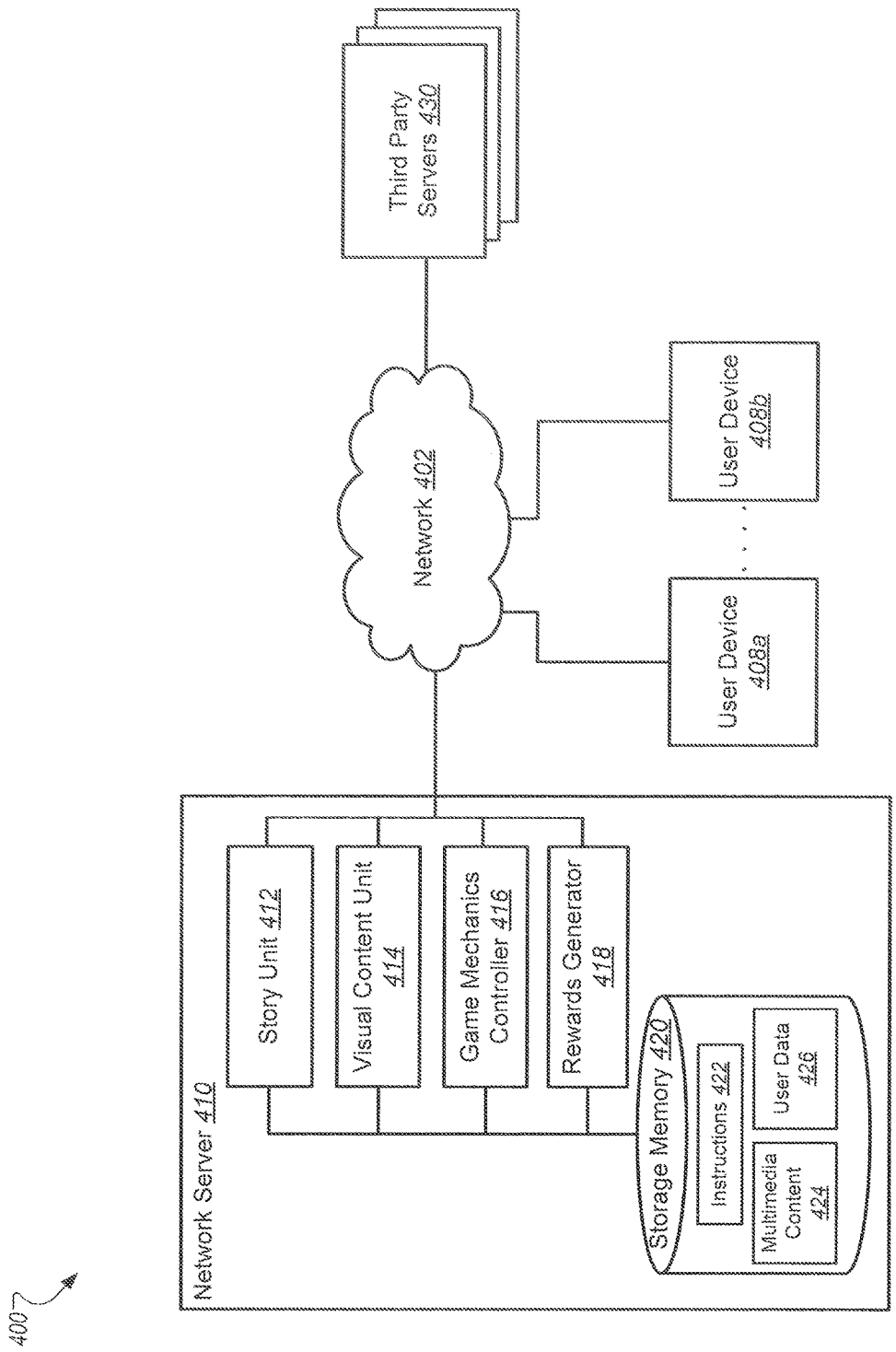
FIG. 4 illustrates a block diagram of an example system for generating and streaming interactive multimedia content that combines a dramatic story with a computer game.

FIG. 4 illustrates a block diagram of an example system 400 for generating and streaming interactive multimedia content that combines a dramatic story series with a computer game. In some implementations, the system 400 corresponds to components of the system 300. However, the system 400 also may correspond to other systems or configurations.

The system 400 includes a network server 410 that is communicatively coupled to user devices 408a and 408b over network 402. The network server 410 and the user devices 408a, 408b are also communicatively coupled to third party servers 430 over the network 402. The network server 410 includes a story unit 412, a visual content unit 424, game mechanics controller 426, rewards generator 428 and storage memory 420. The storage memory 420 includes instructions 422, multimedia content 424 and user data 426.

In some implementations, the network server 410 is similar to the network server 310. The network server 410 may be hosted as an Internet cloud server. For example, the network server 410 may be hosted by a cloud services provider that supports docket containerization on Linux, such as Amazon Web Services™.

The network server 410 is configured to stream the story component of the interactive multimedia content over the network 402 to user devices, such as user devices 408a or 408b, along with game challenges that control the flow or narrative of the storyline. As described previously, in some implementations the story component corresponds to a scripted, realistically depicted, audio/visual streaming dramatic storyline that is streamed over the network to be displayed on monitors coupled to the user devices. The dramatic story is broken into episodes of finite durations, and each episode is further broken into a number of segments that are called story panels. At an instant in time, a story panel associated with an episode is shown on the display coupled to the user device. At the end of each story panel, a player viewing the story panel gets a prompt to use a suitable input device to interact with the story element to initiate gameplay. The story element that is acted on (i.e., interacted with) may be an environmental scenic depiction (for example, atmosphere, ocean, waterway, wetland, forest, landscape, cityscape, desert, or icecap, among others) that, when represented in time-lapse, may be shown to be in a state of degeneration. The degeneration may be represented on-screen in an alternative way, for example with the depiction of a land, water, or airborne life form being affected by environmental degradation, such as caused by climate change.

Although two user devices 408a and 408b are shown, the system 400 can include other user devices as well. In some implementations, the network server 410 streams the interactive multimedia content to multiple user devices simultaneously. The storyline that is concurrently streamed to different user devices can be the same. In other implementations, different storylines are concurrently streamed to different groups of user devices, or a different storyline are streamed to each individual user device. The network server 410 can be configured to handle multiple instances of the dramatic storyline and associated computer game that are processed by different user devices.

In some implementations, there is a large number of user devices to which the content is streamed, for example in the order of hundreds of thousands or millions. The network server 410 can be configured to concurrently manage the large number of instances of the story/game that are streamed to all these devices. The network server 410 may represent a cluster of network servers that are configured to operate together to handle the different instances of streaming content and interactions with the large number of user devices.

The network server 410 includes one or more processors, which are configured to execute instructions 422 stored in the storage memory 420. In some implementations, the instructions 422 encode instructions for operation of the story unit 412, the visual content unit 424, the game mechanics controller 426, or the rewards generator 428. For example, the instructions 422 can include instructions for generating or streaming episodes associated with dramatic storylines to user devices, responding to player interactions during gameplay, computing player scores and determining rewards. The instructions 422 also can include instructions for connecting the player's information to social media profiles that are hosted by one or more electronic social media networks, for example in the third party servers 430.

In some implementations, the instructions 422 that are executed by the network server 410 represent elastic containerized programming that controls instances of different players' devices communicating with the network server 410. The programming can include smart routing of player transactions between the respective players' devices and the network server 410 with suitable network protocols. The programming can support micro services to enable discrete parts of the application to scale independently.

In some implementations, the instructions for generating and/or streaming multimedia content by the network server 410 are associated with the story unit 412. The story unit 412 may be similar to the story unit 312. The story unit 412 can be configured to store and manage multimedia content corresponding to multiple different dramatic storylines. The multimedia content can be stored in the story unit 412, or stored in the storage memory 420, for example as multimedia content 424 that is accessible by the story unit 412.

In some implementations, the network server 410 selects episodes from different storylines, or different episodes from a storyline, for steaming based on the player's interaction during gameplay. In this manner, the flow of the streamed multimedia content can be dynamically altered based on user input. The story unit 412 can be configured to accept and store additional new storylines.

In some implementations, the story unit 412 is configured to dynamically generate new storylines, for example based on existing storylines. For example, the story unit 412 can interact with the game mechanics controller 416 to determine interactions made by a player during gameplay. The game mechanics controller 416 may be similar to the game mechanics controller 316. As described previously, the game mechanics controller 416 may receive signals from a user device, such as 408a or 408b, when a player associated with the particular device interacts with the gameplay prompt 106. Based on the received signals, the game mechanics controller 416 can interact with the story unit 412 to determine the next story panel or episode to stream to the user device.

In some implementations, the game mechanics controller 416 and/or the story unit 412 predicts, through mutual interaction, future player inputs. Based on such prediction, the story unit 412 can modify the storyline that is streamed to the user device. For example, the visual content unit 414, which may be similar to the visual content unit 314, may store different scenes or visualizations for the storylines. The story unit 412 may dynamically modify an existing storyline that is streamed to the user device by updating scenes or visualizations that are included in the story panels of episodes in the existing storyline. Additionally or alternatively, the story unit 412 may create new storylines, or new episodes for existing storylines, by combining scenes or visualizations from the visual content unit 414 in new ways. In some implementations, the updates to the existing storylines, or creating new storylines, are done to calibrate the gameplay challenges that are presented to the player, or to change the flow of the storyline shown to the player, based on the player's past interactions.

The rewards generator 418, which is similar to the rewards generator 318 in some implementations, computes gameplay scores for a player, for example player 304, based on how well the player addresses the game challenges. In some implementations, the rewards generator 418 interacts with the game mechanics controller 416 to determine the interactions made by the player during gameplay. As described previously, the rewards generator 418 can send the computed score to the player's device, for example user device 408a or 408b, to be displayed to the player. Additionally or alternatively, the score can be recorded as part of the player's profile, which can be stored as part of user data 426 in the storage memory 420.

In some implementations, the rewards generator 418 sends the player's score to be published as part of the player's social media profile. For example, the rewards generator 418 may connect, over the new 402, to a third party server 430 hosting an electronic social media network that includes the player's social media profile. The rewards generator 418 may access the player's social media profile using one or more APIs provided by the electronic social media network, and post the player's score in the social media profile. The player can have multiple social media profiles in different social media networks. The rewards generator 418 can be configured to access the player's social media profiles in one or more of the social media networks, and publish the player's score as part of the accessed social media profile(s). The one or more social media profiles that are accessed may be the ones for which the player provides access permission to the network server 410.

In some implementations, the storage memory 420 stores the various instructions 422, the multimedia content 424 and the user data 426. The storage memory 420 may include read-only memory (ROM), random access memory (RAM), or flash memory. Additionally or alternatively, the storage memory 420 may include magnetic or optical memory, such as hard disk drives, computer disc or digital video disc memory (CD-ROM or DVD-ROM), among others.

In some implementations, the instructions 422, the multimedia content 424, or the user data 426, are stored in one or more databases, for example implemented in the storage memory 420. The databases can be implemented as fast in-memory operational databases, such as VoltDB™, which may be optimized for fast data transactions needed for gaming. In such cases, an instance of the game that is played on a user device sends an API call to a database in the storage memory 420. The associated player's interaction with the game can be captured in real-time in the database, i.e., as the interactions take place, based on signals sent by the instance of the game played on the user device. There may be multiple clusters of the database, where each cluster can correspond to a different instance of the game played on a different user device. In this manner, the multiple clusters can be used to capture transactions corresponding to different instances of the game being played.

In some implementations, a relational database management system (RDBMS) is used for scalability. The database may provide cost-efficient and resizable capacity while managing time-consuming database management tasks. For example, Amazon Aurora™ relational database management system may be used. Alternatively, Hewlett-Packard's Vertica™ database may be used due to its flexibility, speed and robustness.

FIGS. 5A-5E illustrate example processes 500A-500E for generating and streaming interactive multimedia content that combines a dramatic story series with a computer game. In some implementations, the processes 500A-500E are performed by the system 400. Accordingly, the following section describes the processes 500A-500E with respect to the system 400. However, the processes 500A-500E also may be performed by other devices or system configurations.

In some implementations, the processes 500A-500E are performed by one or more processors included in the system 400 that execute instructions, for example instructions 422, to generate and stream episodes of a interactive dramatic story, manage player interactions during gameplay, compute player scores, determine reward options and interface with social media networks. As described previously, these instructions can be stored in storage memory (for example, storage memory 420) that is included in the system 400.

Figure 5A:
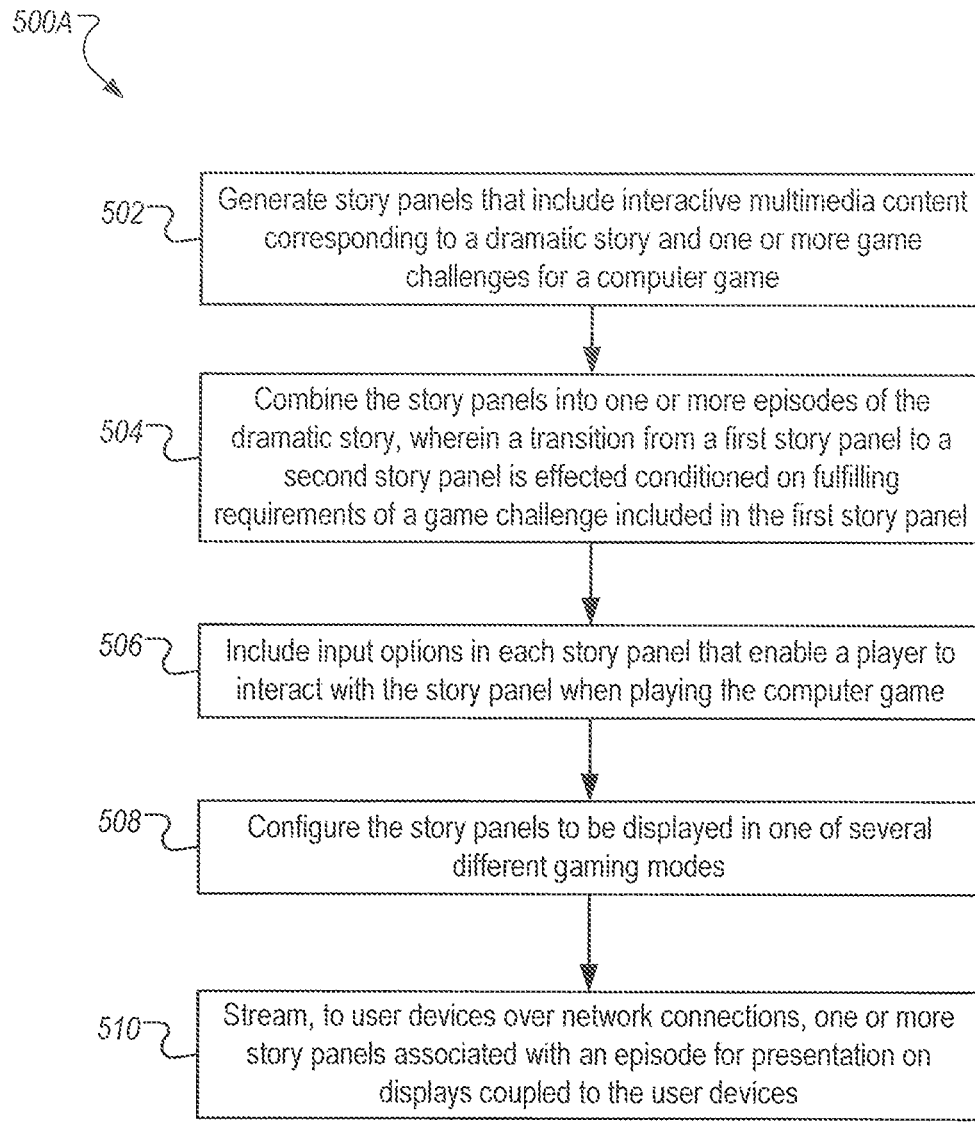
FIGS. 5A-5E illustrate example processes for generating and streaming interactive multimedia content that combines a dramatic story series with a computer game.

As shown in FIG. 5A, the process 500A starts by generating story panels that include interactive multimedia content corresponding to a dramatic story and one or more game challenges for a computer game (502). For example, the network server 410 may execute instructions corresponding to the story unit 412 to generate a scripted, realistically depicted, audio/visual streaming dramatic story. The dramatic story may be similar to an interactive TV drama series. The dramatic story may include multiple story panels, with each story panel presenting a scene or visualization of the dramatic story. The story unit 412 may interact with the visual content unit 414 to generate the story panels, for example story panel 100. The dramatic story may be associated with a computer game, where the flow of the dramatic story may be dependent on a player's interactions during gameplay. The story unit may generate different story panels that may correspond to the different flows of the dramatic story.

The story panels are combined into one or more episodes of the dramatic story, where a transition from a first story panel to a second story panel is effected conditioned on fulfilling requirements of a game challenge included in the first story panel (504). For example, the dramatic story may be partitioned into multiple episodes, with each episode depicting a particular situation or series of events through a number of story panels included in the episode. The story unit 412 may group the story panels into different episodes, with story panels that are grouped into an episode sharing a common theme, for example, a common situation or event depicted in the story panels.

Input options are included in each story panel that enable a player to interact with the story panel when playing the computer game (506). For example, the story unit 412 may embed gameplay prompts in the story panels, such as gameplay prompt 106 included in story panel 100, which enable a player to interact with the scene presented in the story panel and respond to game challenges in the gaming mode. The game mechanics controller 416 may process the inputs provided by the player when responding to the game challenges that are presented in each story panel. As described previously, the story unit 412 may associate instructions with the gameplay prompts that determine the next story panel to be shown to the player based on the player's responses to the game challenge in the present story panel. The story unit 412 also may include navigation prompts in each story panel to allow the player to navigate among the story panels in an episode, without engaging in gameplay.

The story panels are configured to be displayed in one of several different gaming modes (508). For example, the story unit 412 may configure one or more story panels to be initially displayed in the story mode, in which gameplay prompts in the story panels are temporarily disabled while a television dramatic story is presented in the story panel.

Additionally or alternatively, the story unit 412 may configure one or more story panels to be displayed in the read mode, in which the gameplay prompts in the story panels are enabled. A story panel may be configured to transition from the story mode to the read mode, for example, when the narrative of the television dramatic story in the read mode comes to a conclusion.

Additionally or alternatively, the story unit 412 may configure one or more story panels to be displayed in the game mode, in which the story panel presents an interactive challenge to the player and the computer game waits for input from the player to proceed. A story panel may be configured to transition to the game mode from either the story mode or the read mode.

Additionally or alternatively, the story unit 412 may configure one or more story panels to be displayed in the administrative mode, in which a player can check aggregate game scores, view possible prizes, or access associated social media profile. A story panel may be configured to transition to the administrative mode from any of the story mode, read mode, or game mode. For example, a story panel may include a control option, which the player can select while in one of the story mode, read mode or game mode, to invoke the administrative mode.

One or more story panels associated with an episode are streamed to user devices over network connections for presentation on displays coupled to the user devices (510). For example, the network server 410 may stream story panels associated with an episode, such as episode 324, to user devices, such as device 408a and/or 408b. The story panels may be presented on monitors, such as monitor 202, coupled to the user devices. The story panels that are presented may include one or more prompts, such as navigation prompt 104 and gameplay prompt 106 that are shown on the story panel 100.

Figure 5B:
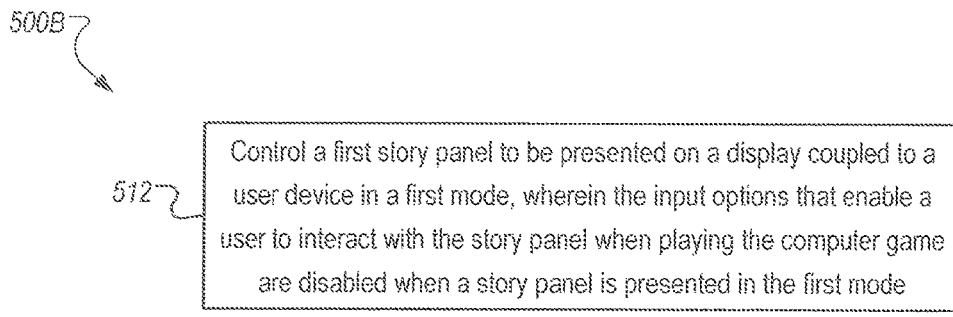

In some implementations, the example process 500B shown in FIG. 5B is performed in conjunction with the process 500A. For example, the process 500B may be performed following the streaming of one or more story panels for presentation on displays coupled to the user devices (510). When the process 500B is performed, a first story panel is controlled to be presented on a display coupled to a user device in a first mode, wherein the input options that enable a user to interact with the story panel when playing the computer game are disabled when a story panel is presented in the first mode (512). For example, based on the instructions sent by the network server 410, a user device, such as 408a or 408b, may present a story panel in the story mode. As noted previously, gameplay prompts in the story panel are disabled in the story mode, while a television dramatic story is presented in the story panel.

Figure 5C:
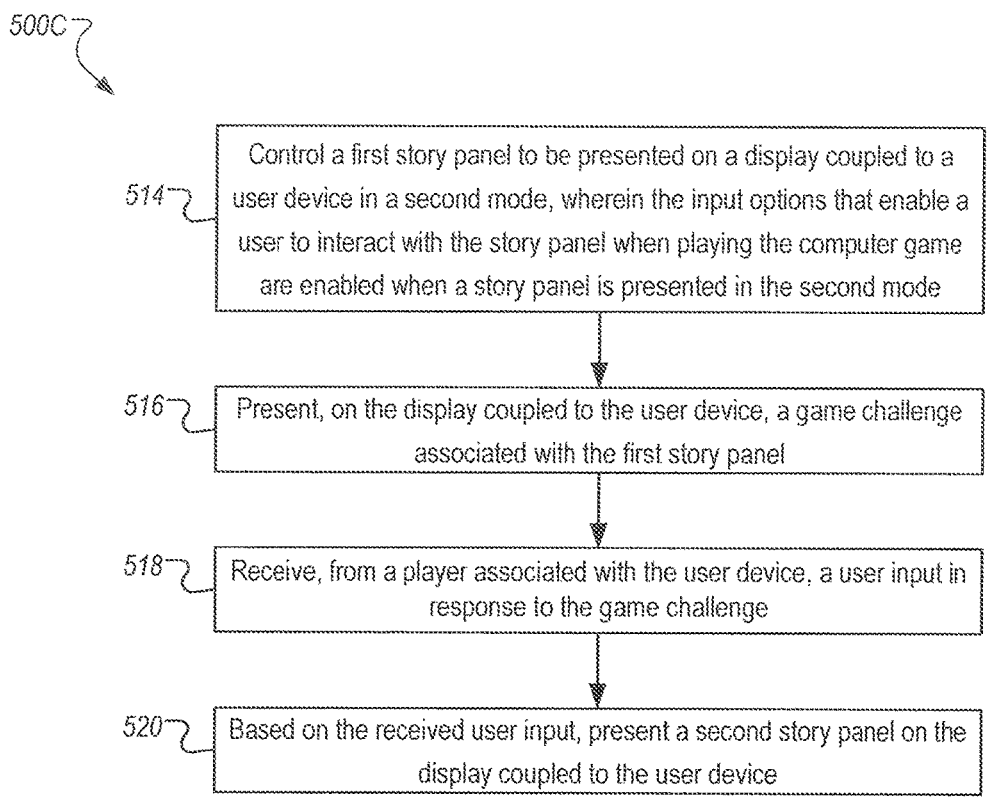

FIG. 5C shows the example process 500C. In some implementations, the process 500C is performed in conjunction with the process 500A. For example, the process 500C may be performed following the streaming of one or more story panels for presentation on displays coupled to the user devices (510). However, in some other implementations, the process 500C is performed in conjunction with the process 500B. For example, the process 500C may be performed after a first story panel is presented on a display coupled to a user device in the first mode (512).

In the process 500C, a first story panel is controlled to be presented on a display coupled to a user device in a second mode, wherein the input options that enable a user to interact with the story panel when playing the computer game are enabled when a story panel is presented in the second mode (514). For example, based on the instructions sent by the network server 410, a user device, such as 408a or 408b, may present a story panel in the read mode or the game mode. As noted previously, gameplay prompts in the story panel are enabled in the read mode or the game mode. In some implementations, the story panel transitions to the read mode or the game mode after the presentation of the story panel in the story mode is completed.

A game challenge associated with the first story panel is presented on the display coupled to the user device (516). For example, when the user device presents a story panel in the game mode, a gameplay screen, such as gameplay screen 326, may be displayed. Based on the instructions sent by the network server 410, the user device may present an interactive challenge to the player in the story panel when the gameplay screen is displayed, and wait for input from the player to proceed.

A user input in response to the game challenge is received from a player associated with the user device (518). For example, the user device may receive an input from the player, such as an interaction with the gameplay prompt, in response to the game challenge that is shown in the story panel. The user device may send a signal to the game mechanics controller 416 when the player interacts with the gameplay prompt.

Based on the received user input, a second story panel is presented on the display coupled to the user device (520). For example, in some implementations upon receiving the signal from the user device associated with the player's interaction with the gameplay prompt, the game mechanics controller 416 interacts with the story unit 412 and/or the visual content unit 414 to send a new story panel, or new scenes corresponding to the presently displayed story panel, to the user device. The new story panel, or the new scene, is displayed on the monitor coupled to the user device. The user device may select, from a plurality of story panels that are locally cached, a new story panel for displaying to the user. In such cases, the user device may perform the selection based on instructions that are sent by the network server 410 along with the story panels.

Figure 5D:
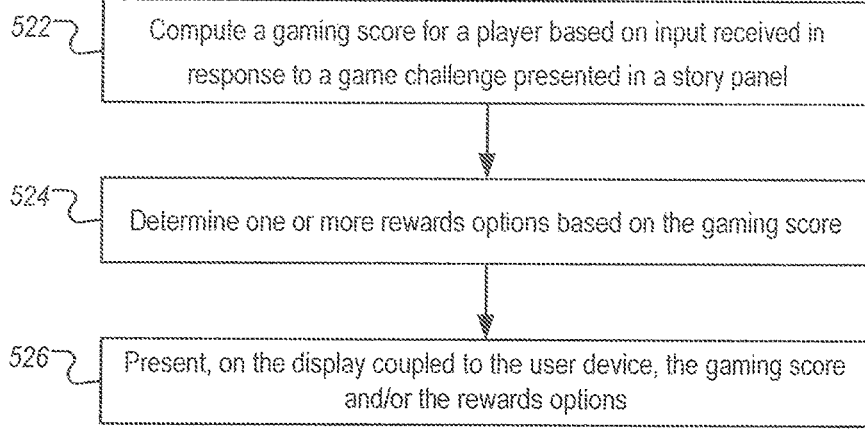

FIG. 5D shows the example process 500D. In some implementations, the process 500D is performed in conjunction with the process 500C. For example, the process 500D may be performed following the presentation of a second story panel on the display coupled to the user device based on the received user input (520).

When the process 500D is performed, a gaming score is computed for a player based on the input in response to a game challenge presented in a story panel (522). For example, in response to receiving, from the user device associated with the player, a signal that includes information about the player's response to the game challenge, the game mechanics controller 416 may interact with the rewards generator 418 to compute a score as a measure of how well the player addresses the game challenge.

One or more rewards options are determined based on the gaming score (524). For example, the rewards generator 418 may determine prizes or other rewards of gameplay based on the score computed for the player. The rewards may include, among others, posting of the player's score on a leaderboard that is accessible to other players of the game, or posting of the player's score on a social media website, for example associated with the player's social media profile, or with a social media account associated with the computer game.

The gaming score and/or the rewards options are presented on the display coupled to the user device (526). For example, the network server 410 may send the score computed by the rewards generator 418 to the user device to be displayed on the monitor coupled to the user device. Additionally or alternatively, the network server 410 may send rewards options, which are determined by the rewards generator 418, to be displayed on the monitor coupled to the user device. Based on the instructions and information received from the network server 410, the user device may display the player's score and/or the rewards options on the monitor coupled to the user device. The user device may display the player's score and/or the rewards options on the story panel that is presently displayed.

Figure 5E:
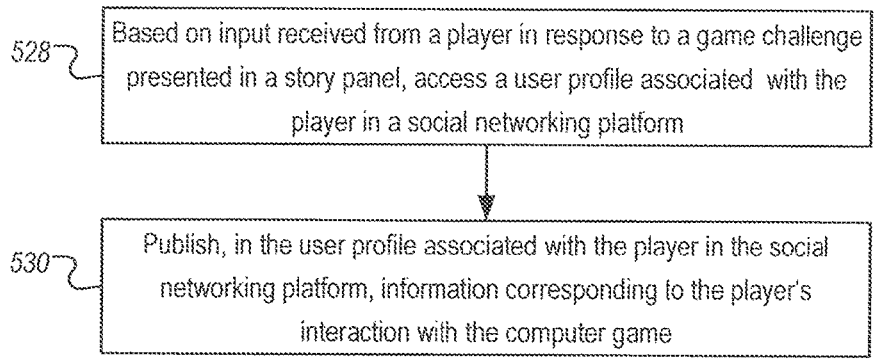

FIG. 5E shows the example process 500E. In some implementations, the process 500E is performed in conjunction with the process 500C. For example, the process 500E may be performed following the presentation of a second story panel on the display coupled to the user device based on the received user input (520). However, in some other implementations, the process 500E is performed in conjunction with the process 500D. For example, the process 500E may be performed in association with presenting the gaming score and/or the rewards options on the display coupled to the user device (526).

In the process 500E, based on input received from a player in response to a game challenge presented in a story panel, a user profile associated with the player in a social networking platform is accessed (528). For example, the player may have a social media profile in an online electronic social media network, and may grant permission to the computer game to access the social media profile. In such cases, the network server 410 may access the player's social media profile using one or more APIs provided by the electronic social media network.

Information corresponding to the player's interaction with the computer game is published in the user profile associated with the player in the social networking platform (530). For example, the network server 410 may post the player's game score, which may be computed by the rewards generator 418 as noted above, in the player's social media profile. The network server 410 may post additional information about the player's interaction with the computer game in the player's social media profile, such as the responses provided by the player, or results achieved to combat challenges posted by the game.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, for example, code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, for example, code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, for example an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, for example magnetic, magneto optical disks, or optical disks. However, a computer need not have such devices. Computer readable media suitable for storing computer program instructions and data can include all forms of nonvolatile memory, media and memory devices, including by way of example semiconductor memory devices, for example EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. For example, a communications channel may include the Web, where a user may interact with an interaction site via a webpage generated dynamically according to the interaction flow. As another example, a communications channel may include a smart phone application, where a user may interact with an interaction site by starting a smart phone application, and the smart phone application then contacts the interaction site and provides a communications interface between the user and the interaction site. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method comprising:
generating story panels, wherein a story panel includes multimedia content and forms a portion of a computer game that corresponds to a dramatic story with one or more game challenges;
combining the story panels into one or more episodes of the dramatic story, wherein a transition from a first story panel to a second story panel is effected conditioned on fulfilling requirements of a game challenge included in the first story panel;
including, in each story panel, input options that enable a user to interact with the story panel when playing the computer game;
configuring the story panels to be displayed in one of several different gaming modes;
controlling streaming, to electronic devices over network connections, one or more story panels associated with an episode for presentation on displays coupled to the electronic devices, in one of a plurality of presentation modes of the computer game, wherein the one or more story panels can be independently presented on different electronic devices in different presentation modes;
controlling multimedia content of a first story panel to be presented on a display coupled to a first electronic device in a first presentation mode, wherein the input options are enabled when a story panel is presented in the first presentation mode;
following completion of the presentation of the multimedia content of the first story panel, presenting, on the display coupled to the first electronic device, a game challenge associated with the first story panel;
receiving, from a user associated with the first electronic device, a user input in response to the game challenge;
determining a user action by processing the user input; and
in response to determining the user action, selecting a second story panel for presentation on the display coupled to the first electronic device.

2. The method of claim 1, further comprising:
controlling a first story panel to be presented on a display coupled to an electronic device in a second presentation mode, wherein the input options that enable a user to interact with the story panel when playing the computer game are disabled when a story panel is presented in the second presentation mode.

3. The method of claim 1, wherein the first story panel is included in a first episode of the dramatic story, and wherein selecting the second story panel comprises:
selecting the second story panel from the story panels included in the first episode.

4. The method of claim 1, further comprising:
computing a gaming score for the user based on the user input;
determining one or more rewards options based on the gaming score; and
presenting, on the display coupled to the first electronic device, the one or more rewards options for selection by the user.

5. The method of claim 4, further comprising:
accessing a user profile associated with the user; and
storing the gaming score as part of the user profile.

6. The method of claim 1, further comprising:
based on the user input, accessing a user profile associated with the user in a social networking platform; and
publishing, in the user profile associated with the user in the social networking platform, information corresponding to the computer game and the user input.

7. The method of claim 1, wherein an episode includes story panels that, when presented in a sequential manner, narrate a portion of a scripted, realistically depicted, audio/visual streaming dramatic story.

8. The method of claim 1, wherein a game challenge includes game mechanics that are configured to enable the user to win points or prizes of gameplay by interacting with the multimedia content to process one or more gameplay scenarios as the multimedia content is presented in episodic form.

9. The method of claim 1, wherein the input options enable a user to control display of the story panels, wherein the control includes one or more of start, stop, move backwards, and forward between previously-viewed or currently-viewed story panels like pages of a multimedia book.

10. The method of claim 1, wherein the multimedia content includes one or more of degeneration in the Earth's atmosphere, ocean, waterway, wetlands, forest, landscape, desert, icecap, or land, water, and airborne life forms.

11. The method of claim 1, wherein controlling the first story panel to be presented on the display coupled to the first electronic device in the first presentation mode comprises:

presenting, embedded with the multimedia content of the first story panel, user interaction points;

receiving information about a selection, by the user of the first electronic device, of a user interaction point in embedded in the first story panel; and in response to receiving the information about the selection, presenting, on the display coupled to the first electronic device, additional information about a particular feature in the first story panel corresponding to the selected user interaction point.

12. The method of claim 1, further comprising enabling users to interact with the computer game using ancillary devices that are communicatively coupled to respective electronic devices, wherein receiving the user input from the user of the first electronic device comprises receiving, through a first ancillary device that is communicatively coupled to the first electronic device, selection of an input option by the user using the first ancillary device.

13. The method of claim 12, wherein the first ancillary device includes a display that presents a secondary view of the first story panel shown on the display coupled to the first electronic device.

14. The method of claim 1, further comprising:

recording the user action along with actions by various users of other electronic devices playing the computer game; and enabling one or more of decision makers or policy makers to obtain, for policy making, collective information corresponding to user actions of the various users.

15. The method of claim 1, further comprising:

controlling the one or more story panels to be presented on a display coupled to a second electronic device in a second presentation mode, wherein a dramatic presentation of various storylines of the computer game as game simulations are displayed to a second user of the second electronic device without requiring interaction from the second user when the one or more story panels are presented in the second presentation mode.

16. The method of claim 1, further comprising:

recording the user action along with previous actions by the user of the first electronic device;

analyzing the user action in conjunction with the previous actions by the user;

in response to analyzing the user action in conjunction with the previous actions by the user, predicting a future action by the user;

determining, based on the predicted future action, one or more story panels that are likely to be displayed; and sending, to the first electronic device, the one or more story panels that are likely to be displayed.

17. The method of claim 1, wherein selecting the second story panel for presentation on the display coupled to the first electronic device:

recording the user action by the user of the first electronic device;

recording actions by various users of other electronic devices playing the computer game;

analyzing the user action by the user of the first electronic device along with analyzing the actions by the various users of the other electronic devices; and in response to analyzing the user action by the user of the first electronic device along with the actions by the various users of the other electronic devices, determining the second story panel for presentation on the display coupled to the first electronic device.

18. A system comprising:

one or more processors;

a story unit that includes instructions stored in machine-readable storage for execution by the one or more processors, wherein upon execution of the instructions the story unit is configured to perform operations comprising:

generating story panels, wherein a story panel includes multimedia content and forms a portion of a computer game that corresponds to a dramatic story with one or more game challenges;

combining the story panels into one or more episodes of the dramatic story, wherein a transition from a first story panel to a second story panel is effected conditioned on fulfilling requirements of a game challenge included in the first story panel;

including, in each story panel, input options that enable a user to interact with the story panel when playing the computer game;

configuring the story panels to be displayed in one of several different gaming modes;

controlling streaming, to electronic devices over network connections, one or more story panels associated with an episode for presentation on displays coupled to the electronic devices, in one of a plurality of presentation modes of the computer game, wherein the one or more story panels can be independently presented on different electronic devices in different presentation modes;

controlling multimedia content of a first story panel to be presented on a display coupled to a first electronic device in a first presentation mode, wherein the input options are enabled when a story panel is presented in the first presentation mode; and following completion of the presentation of the multimedia content of the first story panel, presenting, on the display coupled to the first electronic device, a game challenge associated with the first story panel; and a game mechanics controller that includes instructions stored in machine-readable storage for execution by the one or more processors, wherein upon execution of the instructions the game mechanics controller is configured to perform operations comprising:

receiving, from a user associated with the first electronic device, a user input in response to the game challenge;

determining a user action by processing the user input; and in response to determining the user action, selecting a second story panel for presentation on the display coupled to the first electronic device.

19. The system of claim 18, wherein the story unit is configured to perform operations further comprising:

controlling a first story panel to be presented on a display coupled to an electronic device in a second presentation mode, wherein the input options that enable a user to interact with the story panel when playing the computer game are disabled when a story panel is presented in the second presentation mode.

20. The system of claim 18, wherein the first story panel is included in a first episode of the dramatic story, and wherein selecting the second story panel comprises:

selecting the second story panel from the story panels included in the first episode.

21. The system of claim 18, wherein the game mechanics controller is configured to perform operations further comprising computing a gaming score for the user based on the user input, and wherein the system further comprises a rewards generator that includes instructions stored in machine-readable storage for execution by the one or more processors, wherein upon execution of the instructions the rewards generator is configured to perform operations comprising:
determining one or more rewards options based on the gaming score; and
communicating the one or more rewards options to the story unit for presentation on the display coupled to the first electronic device for selection by the user.

22. The system of claim 21, wherein the rewards generator is configured to perform operations further comprising:
accessing a user profile associated with the user; and
storing the gaming score as part of the user profile.

23. The system of claim 18, wherein the game mechanics controller is configured to perform operations further comprising:
based on the user input, accessing a user profile associated with the user in a social networking platform; and
publishing, in the user profile associated with the user in the social networking platform, information corresponding to the computer game and the user input.

24. The system of claim 18, wherein an episode includes story panels that, when presented in a sequential manner, narrate a portion of a scripted, realistically depicted, audio/visual streaming dramatic story.

25. The system of claim 18, wherein a game challenge includes game mechanics that are configured to enable the user to win points or prizes of gameplay by interacting with the multimedia content to process one or more gameplay scenarios as the multimedia content is presented in episodic form.

26. The system of claim 18, wherein the input options enable a user to control display of the story panels, wherein the control includes one or more of start, stop, move backwards, and forward between previously-viewed or currently-viewed story panels like pages of a multimedia book.

27. The system of claim 18, wherein the multimedia content includes one or more of degeneration in the Earth's atmosphere, ocean, waterway, wetlands, forest, landscape, desert, icecap, or land, water, and airborne life forms.

28. The system of claim 18, further comprising a visual content unit that includes instructions stored in machine-readable storage for execution by the one or more processors, wherein upon execution of the instructions the visual content unit is configured to perform operations comprising:
generating, in association with the story unit, the story panels; and
combining, in association with the story unit, the story panels into one or more episodes of the dramatic story.

29. A non-transitory storage device storing instructions that, when executed by one or more processors, cause the one or more processors to perform operations comprising:
generating story panels, wherein a story panel includes multimedia content and forms a portion of a computer game that corresponds to a dramatic story with one or more game challenges;
combining the story panels into one or more episodes of the dramatic story, wherein a transition from a first story panel to a second story panel is effected conditioned on fulfilling requirements of a game challenge included in the first story panel;
including, in each story panel, input options that enable a user to interact with the story panel when playing the computer game;
configuring the story panels to be displayed in one of several different gaming modes;
controlling streaming, to electronic devices over network connections, one or more story panels associated with an episode for presentation on displays coupled to the electronic devices, in one of a plurality of presentation modes of the computer game, wherein the one or more story panels can be independently presented on different electronic devices in different presentation modes;
controlling multimedia content of a first story panel to be presented on a display coupled to a first electronic device in a first presentation mode, wherein the input options are enabled when a story panel is presented in the first presentation mode;
following completion of the presentation of the multimedia content of the first story panel, presenting, on the display coupled to the first electronic device, a game challenge associated with the first story panel;
receiving, from a user associated with the first electronic device, a user input in response to the game challenge;
determining a user action by processing the user input; and
in response to determining the user action, selecting a second story panel for presentation on the display coupled to the first electronic device.

* * * * *